US009920251B2

(12) United States Patent
Karanikas

(10) Patent No.: US 9,920,251 B2
(45) Date of Patent: Mar. 20, 2018

(54) PYROLYSIS APPARATUS AND METHOD

(71) Applicant: Terry Karanikas, Queensbury, NY (US)

(72) Inventor: Terry Karanikas, Queensbury, NY (US)

( * ) Notice: Subject to any disclaimer, the term of this patent is extended or adjusted under 35 U.S.C. 154(b) by 0 days.

(21) Appl. No.: 13/836,927

(22) Filed: Mar. 15, 2013

(65) Prior Publication Data
US 2014/0262728 A1    Sep. 18, 2014

(51) Int. Cl.
*C10B 7/10*    (2006.01)
*C10B 53/07*    (2006.01)
*B09B 3/00*    (2006.01)
*B29B 17/04*    (2006.01)
*B29L 30/00*    (2006.01)
*B29B 17/00*    (2006.01)

(52) U.S. Cl.
CPC .............. *C10B 7/10* (2013.01); *B09B 3/0075* (2013.01); *B29B 17/04* (2013.01); *C10B 53/07* (2013.01); *B29B 2017/0094* (2013.01); *B29B 2017/0496* (2013.01); *B29L 2030/00* (2013.01); *Y02P 20/143* (2015.11); *Y02W 30/625* (2015.05)

(58) Field of Classification Search
CPC .............. C10B 1/06; C10B 19/00; C10B 7/10
See application file for complete search history.

(56) References Cited

U.S. PATENT DOCUMENTS

| | | | | |
|---|---|---|---|---|
| 4,098,649 A | * | 7/1978 | Redker | 201/44 |
| 4,240,587 A | * | 12/1980 | Letsch | 241/23 |
| 4,711,989 A | * | 12/1987 | Yu | C30B 31/18 |
| | | | | 219/494 |
| 4,900,401 A | * | 2/1990 | Horton | 202/117 |
| 5,997,288 A | * | 12/1999 | Adams | 202/105 |
| 7,893,307 B2 | * | 2/2011 | Smith | 202/118 |
| 2005/0218037 A1 | * | 10/2005 | Pickier et al. | 202/118 |
| 2008/0128259 A1 | | 6/2008 | Kostek et al. | |
| 2011/0024280 A1 | | 2/2011 | Kostek, Sr. et al. | |
| 2012/0111714 A1 | * | 5/2012 | Court et al. | 202/118 |

\* cited by examiner

*Primary Examiner* — Jill A Warden
(74) *Attorney, Agent, or Firm* — Schmeiser, Olsen & Watts, LLP

(57) ABSTRACT

Disclosed herein is a pyrolysis machine that includes a reactor tube configured to conduct pyrolysis on plastic feedstock, wherein the reactor tube is made of a steel material. The pyrolysis machine includes a plurality of ceramic band heaters located in the reactor tube configured to heat the steel material of the reactor tube. The pyrolysis machine includes a plurality of resistance coils located in the ceramic heaters configured to heat the ceramic heaters. Further, the pyrolysis machine includes a temperature sensor located in the reactor tube and a controller configured to regulate the temperature of the ceramic band heaters.

19 Claims, 7 Drawing Sheets

PYROLYSIS APPARATUS AND METHOD

FIELD OF TECHNOLOGY

The subject matter disclosed herein relates generally to an apparatus for performing pyrolysis. More particularly, the subject matter relates to an apparatus for performing a process where hydro-carbon based matter is decomposed by the application of heat for providing an oil based by-product, and a method of use thereof.

BACKGROUND

Pyrolysis is a process in which hydro-carbon based matter is decomposed in an anaerobic environment by the application of heat. In its simplest form, known as batch processing, the material (feedstock) to be pyrolyzed is placed in an air tight container (reactor vessel) with an attached condensing unit, and an exothermic heat source is initiated. As the feedstock decomposes, it gives off gaseous vapors, including condensed oils, and non condensable materials that must be captured in other manners. At the end of the process, gases will cease to be given off and the reactor vessel will contain a mixture of carbon and char which must be cleaned out. The amount of time for this typical pyrolysis process to complete is dependent on the amount and type of feedstock.

This type of batch processing may be converted to a continuous feed process by converting the reactor vessel into a long horizontal tube in which the material is moved from one end of the tube (inlet) to the other end (outlet) by a screw auger turned by a motor. The auger may be either conventional or shaft-less providing that a method is left for gases to move freely throughout the length of the tube. The anaerobic environment is maintained through the use of vacuum pumps, air lock valves, and the optional introduction of nitrogen. However, these continuous feed processes to date have not been as efficient as would be desirable, are not controllable to the extent necessary to raise efficiency. Furthermore, current systems are completely immobile, requiring huge amounts of feedstock to be brought to the site where the continuous feed process device has been permanently installed.

Thus, an improved continuous feed process device for pyrolysis, and method of performing pyrolysis, would be well received in the art.

SUMMARY

According to a first described aspect, a pyrolysis machine comprises: a reactor tube configured to conduct pryolysis on plastic feedstock, wherein the reactor tube is made of a steel material; a plurality of ceramic band heaters located in the reactor tube configured to heat the steel material of the reactor tube; a plurality of resistance coils located in the ceramic heaters configured to heat the ceramic heaters; a temperature sensor located in the reactor tube; and a controller configured to regulate the temperature of the ceramic band heaters.

According to a second described aspect, a pyrolysis machine comprises: a reactor tube configured to conduct pyrolysis on plastic feedstock, the reactor tube include a plurality of zones disposed along a length of the reactor tube; at least one heater located in each of the plurality of zones of the reactor tube configured to heat the reactor tube; a temperature controller located in each zone of the reactor tube; and a controller configured to independently regulate the temperature of each zone in the reactor tube.

According to a third described aspect, a pyrolysis machine comprises: a hopper configured to accept plastic feedstock; a reactor tube connected to the hopper configured to conduct pyrolysis on the plastic feedstock; a conversion portion connected to the reactor tube, the conversion portion configured to convert gases from the reactor tube into fluids for removal; and a frame configured to support the hopper, the reactor tube, and the conversion portion; wherein the hopper, the reactor tube, and the conversion portion and the frame are mountable on a flat bed trailer for transportation.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

Figure 1:
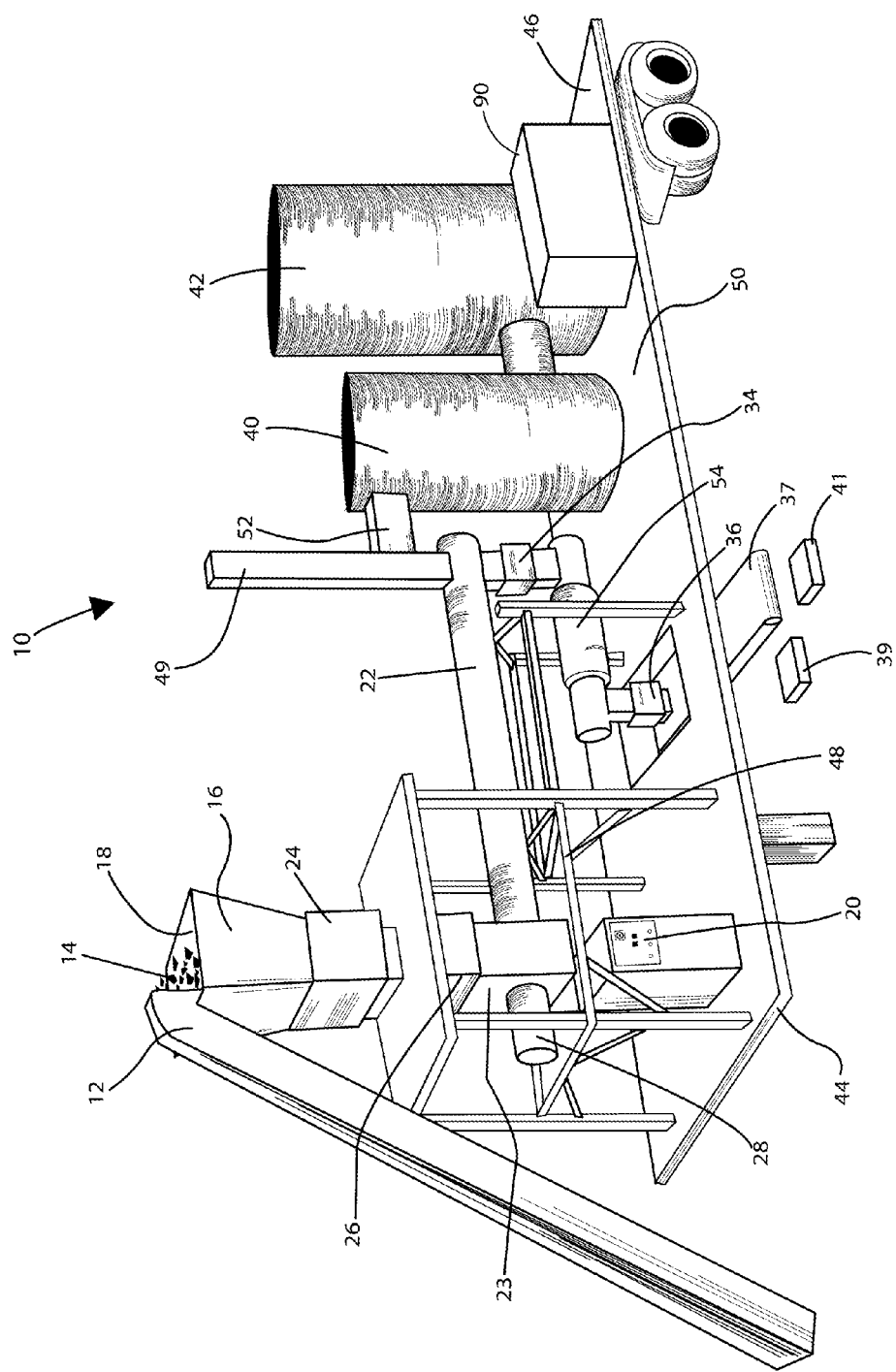
FIG. 1 depicts a perspective view of a pyrolysis machine on a trailer according to one embodiment.
Figure 2:
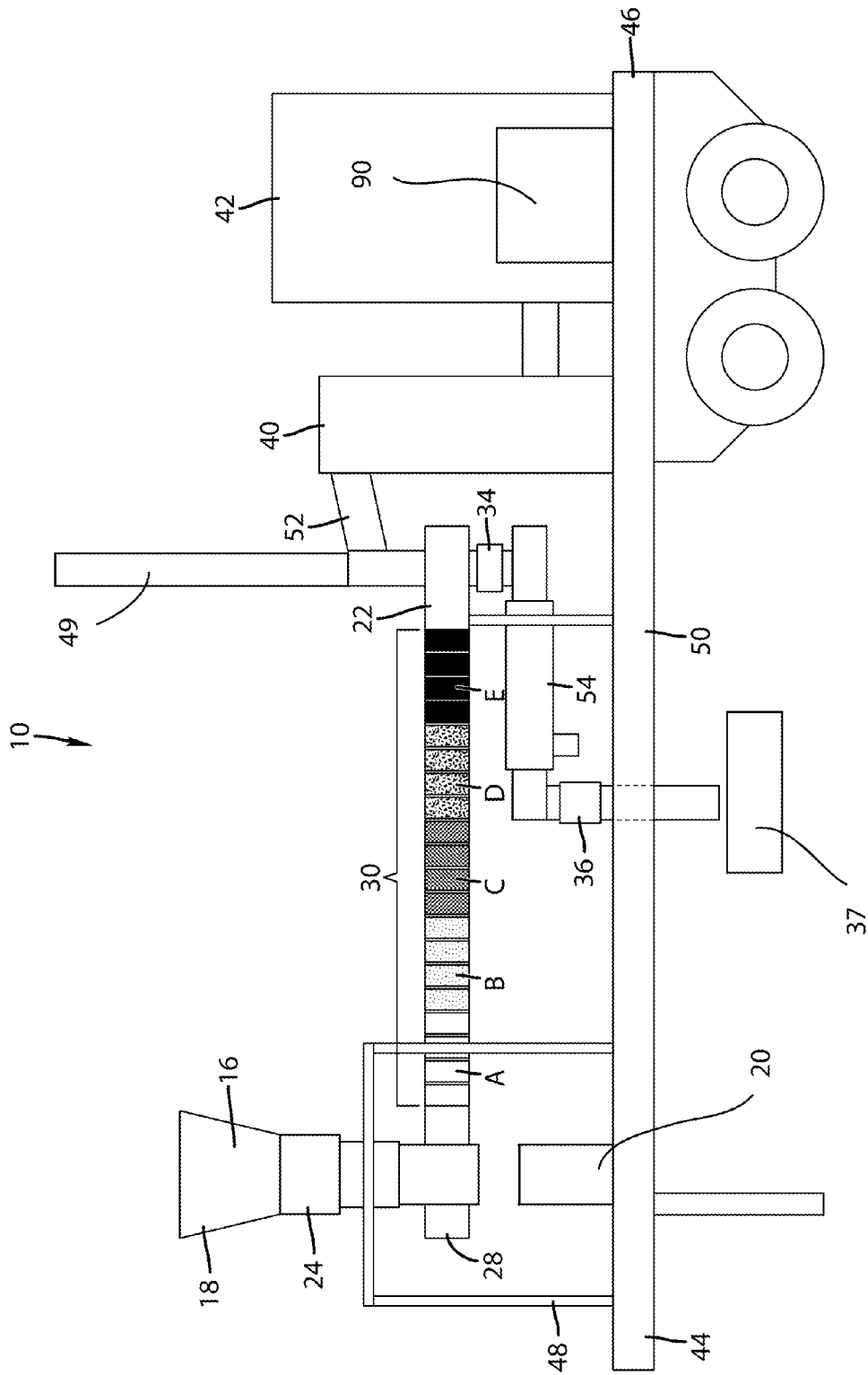
FIG. 2 depicts a side schematic view of the pyrolysis machine of FIG. 1.
Figure 3:
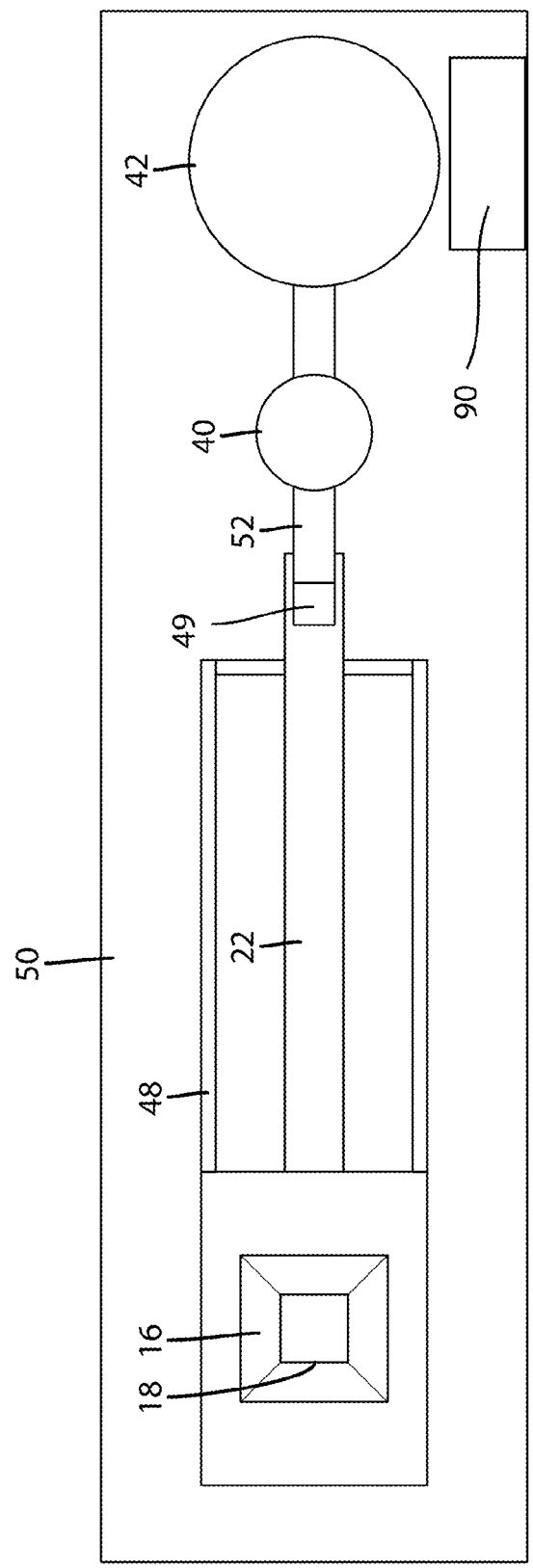
FIG. 3 depicts a top view of the pyrolysis machine of FIGS. 1-2.
Figure 4:
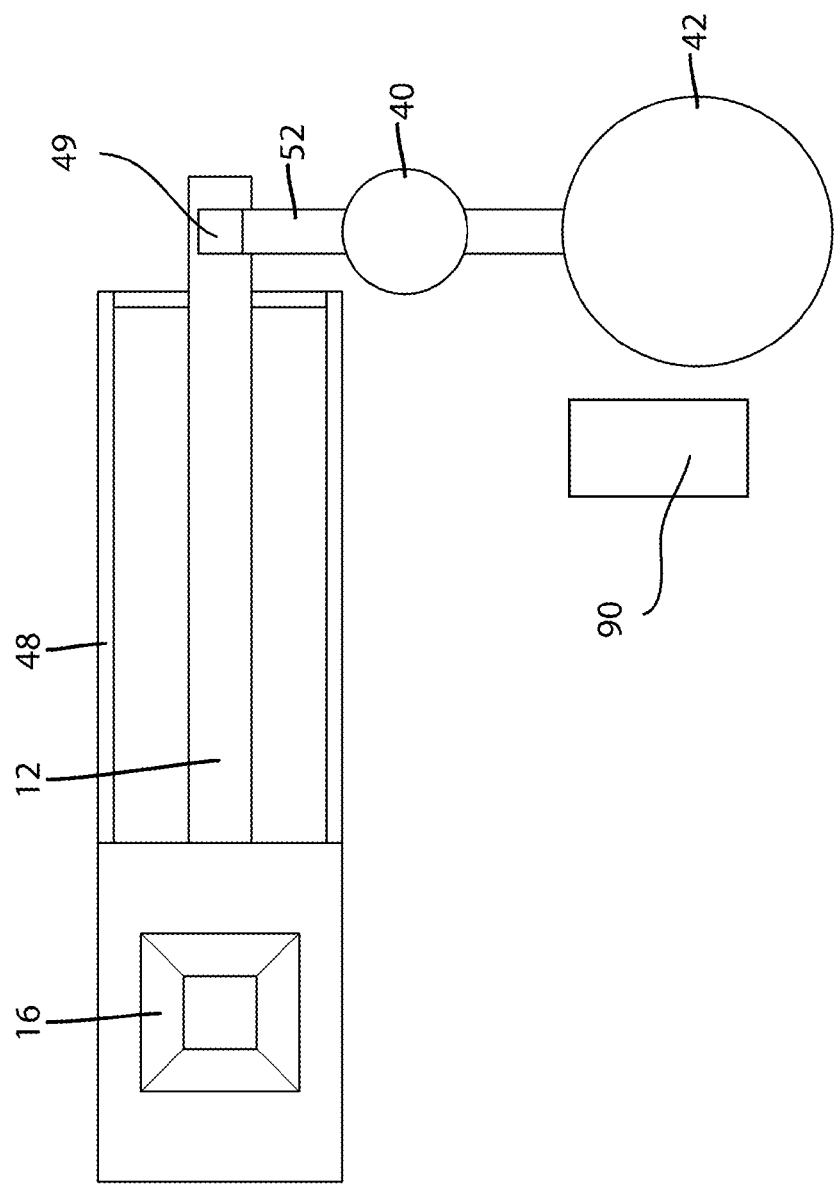
FIG. 4 depicts a top view of the pyrolysis machine of FIGS. 1-3 after being unloaded off the trailer.

A detailed description of the hereinafter described embodiments of the disclosed apparatus and method are presented herein by way of exemplification and not limitation with reference to the Figures.

Referring firstly to FIGS. 1-5, a continuous feed process pyrolysis machine 10 is shown according to one embodiment. The pyrolysis machine 100 includes a conveyor 12 that feeds feedstock 14 into a hopper 16. The conveyor 12 may be a flat belted conveyor, a screw auger, a pneumatic conveyor or some other form of moving the feedstock 14 into the hopper 16. The conveyor 12 may be telescopic, moveable, rotatable or the like, with respect to the pyrolysis machine 10 in order to more easily place feedstock 14 in line to be decomposed. The feedstock 14 may include tires for recycling, or other types of materials such as wood chips and medical waste, for example. The pyrolysis machine 10 described herein may achieve pyrolysis of 20 tons or more of used tires per day. The pyrolysis machine 10 may be compact and transportable. In particular, the pyrolysis machine 10 is shown loaded on a trailer that can be transported with a typical tractor trailer vehicle or truck. Furthermore, the pyrolysis machine 10 may be temperature controllable and programmable for both temperature and speed.

It should be understood that the feedstock may include, for example, polyethylene (PE), polypropylene (PP), polystyrene (PS), polyvinyl chloride (PVC), and polyethylene terephthalate (PET), and may include products such as automobile tires. The amount of the feedstock 14 that is provided into the hopper 16 at a time may be determined by a sensor 18 that is connected to a programmable logic controller (PLC) 20. The PLC 20 may be a computing device that is used in process and device control. The PLC 20 is shown as a controlling unit that is not physically connected to the rest of the pyrolysis machine 10. In practice, the PLC 20 may be connected to the pyrolysis machine 10 through electrical wires or wirelessly. The electrical wiring (not shown) may run from the PLC 20 throughout the entire pyrolysis machine 10. In other embodiments, the PLC 20 may be integrated directly into the pyrolysis machine 10. The PLC 20 may generally be designed to work with little human interaction. In many cases, special interface modules may be available to allow interfacing the motor controllers and temperature controllers of the pyrolysis machine 10 as well as other devices of the pyrolysis machine 10. The sensor 18 may, for example, be a photocell or ultrasonic level detector that is connected to the PLC 20. In this manner, the PLC 20 can determine the amount of the feedstock 14 offered to the hopper 16 by turning the conveyor 12 on or off, or optionally controlling the speed of the conveyor 12.

The pyrolysis machine 10 includes a reactor tube 22 for heating the feedstock 14 that is connected to the hopper 16. The reactor tube 22 may include an auger 25 (shown in FIG. 5) along its length which moves the feedstock 14 through the reactor tube 22 at an appropriate speed, as described hereinbelow. It should be understood, however, that the auger 25 may be any other conveying device that is capable of moving the feedstock 14 along the reactor tube 22. For example, in other embodiments, a spring shaped coil may also rotate. This spring shaped coil may be thought of as an auger that is completely open at its center to a predetermined location from its center. In this spring coil embodiment, solid material may pass over the spring coil as it is rotated. However, the material will gradually make its way to the opposing end from the hopper 16. Moreover, in some embodiments, the reactor tube 22 may be slightly upwardly inclined such that the end connected to the hopper 16 is lower than the opposite end.

When the PLC 20 determines that the reactor tube 22 requires more of the feedstock 14, the PLC 20 may first open a first air lock 24. This may allow feedstock 14 from the hopper 16 to enter into a drop reservoir 23 between the first air lock 24 and a second air lock 26. While the feedstock 14 rests in the drop reservoir 23, a vacuum pump 28 may remove most or all of the atmospheric gases that entered the drop reservoir 23 with the feedstock 14. The second airlock 26 may then open for a predetermined amount of time allowing the feedstock 14 to fall into the reactor tube 22. Once the feedstock 14 falls into the reactor tube 22, the second air lock 26 may then close. At this point, again, the drop reservoir 23 may be emptied of any gases that might have entered from the reactor tube 22 by the vacuum pump 28. The vacuum pump 28 may exhaust both reactor gases and atmospheric gases accumulated from the drop reservoir 23 into a condensing apparatus 30.

Figure 5:
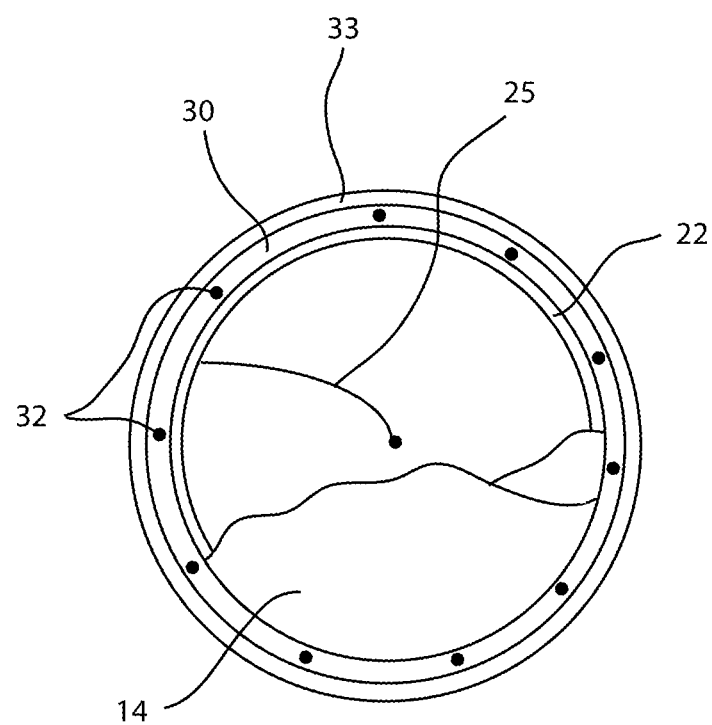
FIG. 5 depicts a cross sectional view of a reactor tube of the pyroloysis device of FIGS. 1-4.

Heat may be applied to the external surfaces of the reactor tube 22 by a series of ceramic band heaters 30 (shown in FIG. 5) which wrap around the circumference of the reactor tube 22. The reactor tube 22 may further include a number of helically wound resistance coils 32 made from nickel-chrome wire, for example, which are strung through the ceramic band heaters 30 forming a flexible surface which conforms to the reactor tube 22. It should be understood that embodiments of the present disclosure are not limited to these ceramic band heaters 30 and helically wound resistance coils 32. Any heating mechanism may be contemplated for heating and decomposing the feedstock 14. The outside of the reactor tube 22 may be covered with an insulator 33 that is configured to keep heat retained within the reactor tube 22. Within the insulator 33 may be located the ceramic band heaters 30. While FIG. 5 shows a cross section of a single band heater 30 with multiple resistance coils 32, it should be understood that a plurality of ceramic band heaters 30 may be disposed coaxially along the length of the reactor tube 22. In one embodiment, the insulator may be a ceramic fiber and/or a metallic sheath to help protect against losses of heat into the atmosphere.

The pyrolysis machine 10 may be approximately forty feet long and covered with nineteen of the ceramic band heaters 30, in one embodiment. The reactor tube 22 may comprise a large portion of this forty foot length. These ceramic band heaters 30 may be divided into five zones A, B, C, D, E of four heaters each. However, it should be understood that the number of ceramic heaters and zones may be altered depending on the embodiment and needs of the system. A thermocouple, or other high temperature measuring device, may be placed in the center of each of the zones A, B, C, D, E on the outer skin of the reactor tube 22 and connected to the PLC 20 or another temperature controlling device in a control panel. Additionally, each of the ceramic band heaters 30 may also be individually controlled by a thermocouple inserted into each of the ceramic band heaters 30 and connected to the PLC 20 or other temperature controlling device. These thermocouples and accompanying control system may allow a controller or user to maintain five different heating zones at different temperatures. Additionally, these thermocouples may allow temperatures to be set for each of the individual ceramic band heaters 30.

Solid matter, such as carbon and char may pass through a third air lock 34 at the end of the reactor tube 22. The carbon and char may be dropped through the third air lock 34 into a water jacket cooling tube 54. From there, the carbon and char and other solid material may be dropped through a fourth airlock 36 onto a second conveying device 37 to be binned for later disposal. The second conveying device 37 may be a magnetic conveyor device, for example, that is configured to separate steel from carbon. In the embodiment shown, the conveyor device 37 is shown expelling steel into a steel bin 39 and carbon into a carbon bin 41.

Figure 7:
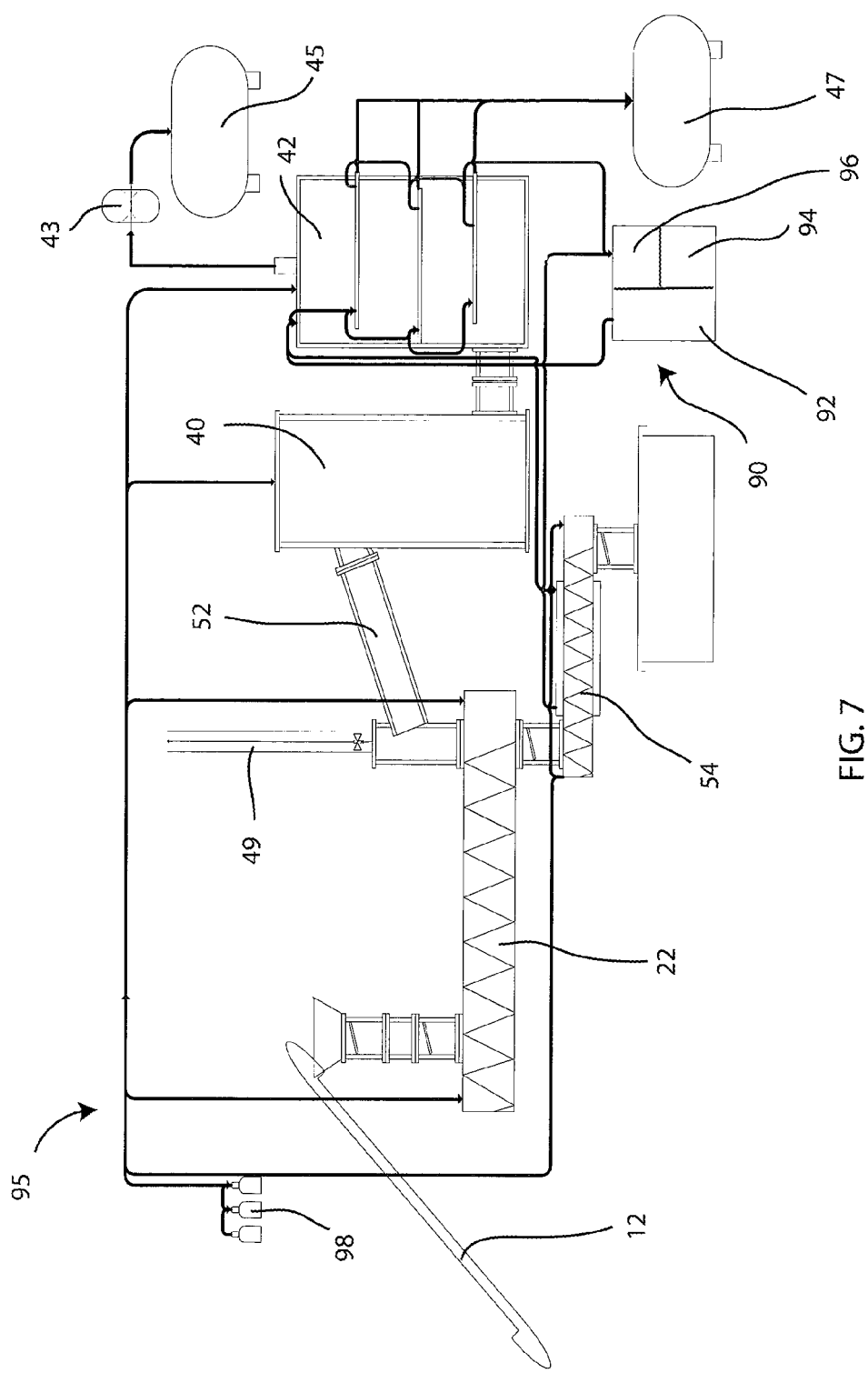
FIG. 7 depicts a schematic view of the pyrolysis machine of FIGS. 1-4 with particular reference to the water and nitrogen distribution system.

The gases resulting from the heating process on the feedstock 14 in the reactor tube 22 may be directed to the top of a tower 40 that is used for either a catalyst or a filter depending on the type of the feedstock 14. The tower 40 may empty into the bottom of a fractional distillation column 42 where condensable gases are converted to fluids and removed. Trays that include water ducts, pipes, channels, lines or the like may provide cool water to the extremely warm gas within the distillation column 42. The condensable gases may thus be forced to condense into fluid and may exit the distillation column 42 at different heights along the distillation column 42. The height at which the gas condenses may affect the properties of the liquid that has been condensed. As such, the condensed fluid that flows from the distillation column 42 may be stored in separate tanks depending on the height from which the fluid condensed. Alternately, a single tank 47 may include separated chambers, as shown in FIG. 7, for separately storing liquid exiting the distillation column 42 at different heights. The storage tank 47 may be any type of storage tank for liquid oil. For example, the storage tank 47 may be a transportable storage tank that is mounted on the back of a tractor trailer.

Non-condensable gases may be removed at the top of the tower 40 for other purposes. The non-condensable gases may leave the fractional distillation column 42 and enter a gas compression pump 43, shown in FIG. 7. From the compression pump, the non-condensable gases may then proceed to a storage tank 45. The storage tank 45 may be any type of storage tank for natural gas. For example, the storage tank 45 may be a transportable storage tank that is mounted on the back of a tractor trailer.

Located between the tower 40 and the reactor tube 22 may be located a pressure relief outlet 49. The pressure relief outlet 49 may include a rupture disk that is configured to allow gas to be released upon even the slightest amount of positive pressure. In other words, the system should always be pulling gas from the reactor tube 22 and into the tower 40 and distillation column 42. There should not be any positive pressure located in the pressure relief outlet 49. If the system experiences positive pressure at this point, the gas is immediately released in order to prevent combustion or fire.

The ceramic band heaters 30, in one embodiment, may be similar to ceramic band heaters that are designed to heat thermoplastic pellets in an aluminum vessel for injection molding. However, rather than using aluminum, the reactor tube 22 may be made from a carbon steel. The carbon steel may, for example, conduct at 43 W/m/° C. This conduction of the carbon steel of the reactor tube 22 may be significantly less than the conduction of aluminum, which may be 250 W/m/° C. or more. As such, in one embodiment, more of the heat remains in the ceramic band heaters 30 than if an aluminum material was used for the reactor tube 22. Because of this, it has been found that, if left on continuously, the internal temperature of the ceramic band heaters 30 will rise at a much faster rate than the carbon steel reactor tube 22. This was found to cause potential melting of the nickel chrome resistance coils 32.

In light of this, the thermocouples inserted into the ceramic band heaters 30 may allow the temperature of the ceramic band heaters 30 to be measured and monitored. As previously described, the thermocouples may be connected to the PLC 20 or another temperature controlling device. The PLC 20 may allow a user to set a maximum temperature for the ceramic band heaters 30 to reach. Alternately or additionally, the PLC 20 may allow a user to set a maximum temperature for each of the zones A, B, C, D and E to reach.

In addition to having the thermocouples on each ceramic band heater 30 report temperatures directly to a single PLC, there may be several temperature controllers located on the pyrolysis machine 10. For example, each of the zones A, B, C, D, E may have its own temperature controller. In the embodiment shown, the temperature controllers are each operated at the PLC 20. This temperature controller may be an electronic device that is connected to a temperature measurement device such as a thermocouple, thermister, or RTD, and to a device controlling the power to the heater, for example, the PLC 20. The temperature controller may attempt to maintain the setpoint of the heater by measuring the temperature and cycling the power to the heater in accordance with selected algorithms. The temperature controller may be a standalone device, or incorporated into a PLC, or the PLC 20, or a similar device. The temperature controllers may be either programmed directly by a human or by a computer interface. Furthermore, in addition to each individual zone A, B, C, D, E having its own temperature controller, each ceramic band heater 30 may also include its own temperature controller device operable by the PLC 20. In other embodiments, specific temperature control input devices may be attached along the reactor tube that allows for an operator to set the control of that zone or particular heater. Using the temperature controllers and the PLC 20, the ceramic band heaters 30 may only be on if the zone in question is below the target set temperature.

In some embodiments, the heater may be manufactured with a thermocouple incorporated in direct contact with the nickel-chrome resistance coils, rather than in contact with the ceramic band heaters 30. Furthermore, a simple thermostat may be used instead of the one or more PLC's described hereinabove.

The reactor tube 22 for conducting the pyrolysis and heating the feedstock 14 may be able to alternate between heating and cooling the feedstock 14 from zone to zone as the feedstock 14 progresses from a first end 44 to a second end 46. For example, the feedstock may be raised to a particular temperature in zone A. The temperature may then be lowered in zone B, and raised back up higher in zone C, then lowered in zone D, and raised again in zone E. Alternately, the temperature may steadily increase from zone A to zone E. In another embodiment, the temperature may be increased from zone A to zone B and from zone B to zone C, and then decreased from zone C to zone D and from zone D to zone E. The pyrolysis machine 10 may accommodate any temperature increases and decreases through the zones A, B, C, D, E.

Furthermore, the PLC 20 may be used to set the speed of the auger 25 for determining how long the feedstock 14 remains in the reactor tube and in each particular zone. It should be understood that the auger may be governed by a polyphase motor, or other powering means. In one embodiment, the speed of the polyphase motor may be controlled by an AC drive. The AC drive may also be considered a variable frequency drive (VFD) or the like. The AC drive may allow the speed of the motor to be adjusted within certain parameters. Settings for the AC drive may be performed by a human or a computer interfacing with the PLC 20. Thus, the PLC 20 may be the controlling mechanism for actually setting the speed of the auger 25. In one embodiment, the auger 25 is configured to stop at different points when the feedstock 14 fully enters a zone. In another embodiment, the auger 25 has a more constant speed, never fully stopping, and letting the feedstock 14 pass through each zone at a relatively constant rate.

As described hereinabove, the pyrolysis machine 10 may be configured to decompose various types of plastics including polyethylene (PE), polypropylene (PP), polystyrene (PS), polyvinyl chloride (PVC) and polyethylene terephthalate (PET). The method of pyrolysis may be what is known as slow pyrolysis, of either static or dynamic operation. Static pyrolysis includes a constant temperature during the process during the process while dynamic pyrolysis includes temperature changing, which may generally include increasing the temperature. In the case that the PLC 20 is used in conjunction with a touch screen interface, for example, the following parameters may be offered in the menu:

| Plastic | T Zone 1 ° C. | T Zone 1 ° C. | T Zone 1 ° C. | T Zone 1 ° C. | T Zone 1 ° C. | Time/ Zone Minutes |
|---|---|---|---|---|---|---|
| PE | 390 | 410 | 430 | 450 | 470 | 12 |
| PP | 354 | 390 | 425 | 450 | 470 | 12 |
| PS | 350 | 370 | 390 | 410 | 425 | 4 |
| PVC | 270 | 325 | 375 | 400 | 440 | 20 |
| PET | 400 | 425 | 450 | 440 | 430 | 30 |
| User1 | | | | | | |
| User2 | | | | | | |

The ability to change menu parameters may be essential in order to compensate for device and environmental characteristics as well as to create menu entries for mixed plastics. The PLC 20 may be configured to be preset for different materials, and users, and various other settings such as speed through the time zone. Furthermore, the PLC 20 or other control mechanism may be configured to control and set parameters to insert certain catalysts into the reactor tube 22, for example, to remove chlorine gas.

The pyrolysis machine 10 may further include a structural frame 48 including stairs (not shown) leading to the hopper 16 for working on the pyrolysis machine 10 by an operator. The frame 48 may also raise the reactor tube 22 a distance above the ground during operation. Due to the small size of the pyrolysis machine 10, the pyrolysis machine 10 may be mobile my mounting the frame 48 and the pyrolysis machine 10 to a modified flat bed trailer 50 or custom design trailer for easy transport to other sites, such as municipal or private waste facilities.

In order to achieve easier transportation, the tower 40 and fractional distillation column 42 may be configured to rotate about the reactor tube 22 and the rest of the pyrolysis machine 10. To achieve this, a conduit 52 that connects the reactor tube 22 and the tower 40 may be configured to rotate. This may allow the tower 40 and fractional distillation column 42 to be rotated in a direct line with the reactor tube 22 for transportation. However, during use, the tower 40 and the fractional distillation column 42 may be rotated perpendicular to the reactor tube 22 in order to reduce the amount of space required to house the pyrolysis machine 10 during use.

Figure 6:
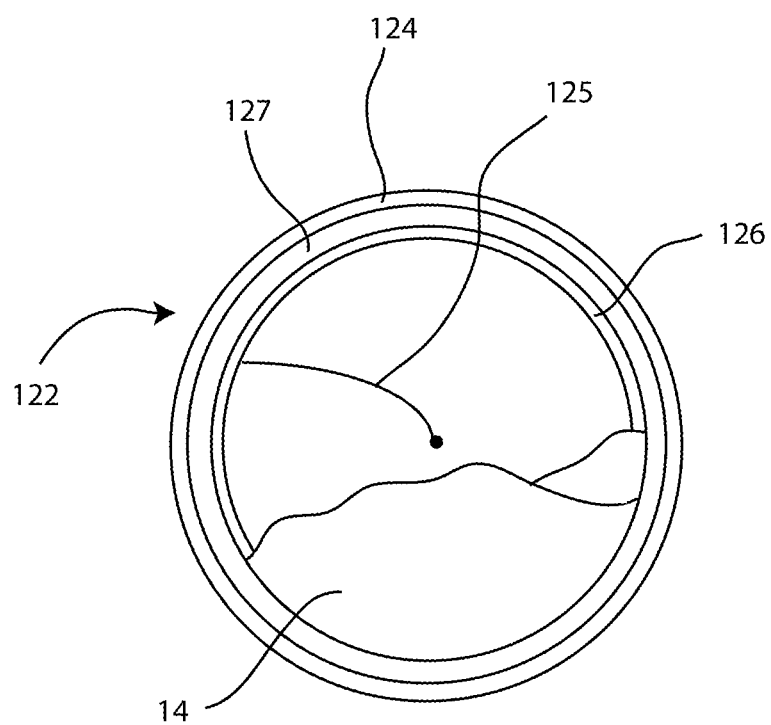
FIG. 6 depicts a cross sectional view of a different reactor tube than FIG. 5 according to another embodiment.

In other embodiments, the ceramic band heaters 30 may be replaced by other heating means. FIG. 6 depicts a cross sectional view of another reactor tube 122 that is not heated by a ceramic band heater 30. Rather, in this embodiment, an insulator jacket 124 is utilized that surrounds a metallic reactor tube body 126. Within the reactor tube body is located an auger 125, similar to the auger 25 configured to move the feedstock along the reactor tube 122 as described hereinabove. Located between the insulator jacket 124 and the metallic reactor tube body 126 may be open space that is fillable with oil or water 127 used for heating the reactor tube. This oil 127 may come from and be recycled back and forth with one or more boilers (not shown) located in the proximity of the reactor tube 122. As described hereinabove, the reactor tube 122 may still include various completely separate zones that are controlled by a PLC such as the PLC 20. As such, multiple boilers may be necessary to provide oil or water that is heated to different temperatures for each zone. Thus, the oil 127 in one zone may be completely separated from the oil 127 in another zone. This may allow the zones to be completely separate and controllable by the PLC. It should be understood that the controllable zones found in the present invention may be achievable with other forms of heating in addition to those described herein.

Shown in FIG. 7 is a schematic view of a water and nitrogen distribution system 95 of the pyrolysis machine 10. These systems 95 may also be controllable by the PLC 20. Nitrogen may first be distributed to the system from one or more nitrogen tanks 98. The nitrogen may be utilized as a precaution against fire. The nitrogen may be distributed to the reactor tube 22, the catalyst tower 40, and the distillation column 42. The nitrogen may further be distributed to the solid matter discharge area. The amount of nitrogen provided to each aspect of the system may be controllable by the PLC 20 and conditions may be programmed into the PLC 20 at which the nitrogen distribution system responds with changes of nitrogen levels being distributed. For example, a condition of a ruptured disk in the pressure relief outlet 49 may be programmed to cause an increased flow of nitrogen into the system.

Moreover, the pyrolysis machine 10 may further include a water distribution system 90. The water distribution system 90 is shown in FIGS. 1 and 7 as a single box. However, this system may be broken down into three distinct elements: a cold water storage reservoir 92, a heat exchanger or radiator 94, and a warm water storage reservoir 96. The cold water is provided to both the solid matter discharge area prior to the solid matter being expelled on the conveying device 37. Warm water may return from this discharge area to the hot water reservoir 96. Moreover, cold water may be provided to the trays of the distillation column 42 in order to condense the gas into its liquid phase. This cold may be distributed via ducts, pipes, channels, lines or the like that are located above or below the trays that are inserted into the distillation column 42. The trays may be configured to create a tight seal to prevent any gas from escaping the distillation column 42 after insertion therein. Warm water may then return from the fractional distillation column 42 to the hot water reservoir 96. The hot water reservoir 96 may be continually providing warm water to the heat exchanger 94 for cooling the water prior to providing the water back to the cool water reservoir 92. The PLC 20, which includes temperature monitoring as described hereinabove, may also be configured to control the water flow to the system in order to effect the temperature of other zones beyond simply the reactor tube 22.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A pyrolysis machine comprising:
    a reactor tube configured to conduct pyrolysis with feedstock;
    a plurality of ceramic band heaters located on the reactor tube configured to heat the reactor tube;
    a plurality of resistance coils located in the ceramic heaters configured to heat the ceramic heaters;
    a temperature sensor located in at least one of the plurality of ceramic band heaters;
    a controller configured to regulate the temperature of the ceramic band heaters; and
    a conversion portion connected to the reactor tube wherein the conversion portion includes a tower and a fractional distillation column, the conversion portion configured to convert gases from the reactor tube into fluids for removal, wherein the pyrolysis machine is transportable, and wherein the tower and the fractional distillation column are configured to rotate about the reactor tube to accommodate transportation and installation at a job site.

2. The pyrolysis machine of claim 1, wherein the reactor tube includes a plurality of zones disposed along a length of the reactor tube, and wherein the controller is configured to independently regulate the temperature of each zone in the reactor tube.

3. The pyrolysis machine of claim 1, wherein the pyrolysis machine is transportable and mounted on a trailer.

4. The pyrolysis machine of claim 1, wherein the reactor tube includes a spring-shaped coil that is open at its center that is configured to move the feedstock, wherein the spring-shaped coil is in communication with the controller, and wherein the controller is configured to regulate the speed of the spring-shaped coil.

5. The pyrolysis machine of claim 1, wherein the controller is configured to turn off each individual ceramic band heater of the plurality of ceramic band heaters when the temperature of the individual ceramic band heater reaches a set level such that the plurality of resistance coils are prevented from melting.

6. The pyrolysis machine of claim 2, wherein the reactor tube includes four zones having four ceramic band heaters each, and one zone having three ceramic band heaters.

7. The pyrolysis machine of claim 2, wherein the controller is configured to turn off each individual ceramic band heater of the plurality of ceramic band heaters when the temperature of the zone that the individual ceramic band heater is in reaches a set level such that the plurality of resistance coils are prevented from melting.

8. The pyrolysis machine of claim 1, further comprising a nitrogen distribution system configured to distribute nitrogen to the reactor tube, a catalyst tower, and a distillation column, wherein the amount of nitrogen provided by the nitrogen distribution system is controlled by the controller.

9. A pyrolysis machine comprising:
a reactor tube configured to conduct pyrolysis with feedstock, wherein the reactor tube includes a plurality of zones disposed along a length of the reactor tube;
at least one heater located on each of the plurality of zones of the reactor tube configured to heat the reactor tube;
a temperature sensor located in each of the plurality of zones of the reactor tube; and
a controller configured to independently regulate the temperature of each zone in the reactor tube;
a nitrogen distribution system configured to distribute nitrogen to the reactor tube, a catalyst tower, and a distillation column, wherein the amount of nitrogen provided by the nitrogen distribution system is controlled by the controller; and
a conversion portion connected to the reactor tube wherein the conversion portion includes a tower and a fractional distillation column, the conversion portion configured to convert gases from the reactor tube into fluids for removal, wherein the pyrolysis machine is transportable, and wherein the tower and the fractional distillation column are configured to rotate about the reactor tube to accommodate transportation and installation at a job site.

10. The pyrolysis machine of claim 9, wherein the pyrolysis machine is transportable and mounted on a trailer.

11. The pyrolysis machine of claim 9, wherein the at least one heater is a plurality of ceramic band heaters located on the reactor tube configured to heat the material of the reactor tube, and wherein the ceramic band heaters further include a plurality of resistance coils located in the ceramic heaters configured to heat the ceramic heaters.

12. The pyrolysis machine of claim 11, wherein the controller is configured to turn off each individual ceramic band heater of the plurality of ceramic band heaters when the temperature of the individual ceramic band heater reaches a set level such that the plurality of resistance coils are prevented from melting.

13. The pyrolysis machine of claim 9, wherein the reactor tube includes four zones having four ceramic band heaters each, and one zone having three ceramic band heaters.

14. The pyrolysis machine of claim 11, wherein the controller is configured to turn off each individual ceramic band heater of the plurality of ceramic band heaters when the temperature of the zone that the individual ceramic band heater is in reaches a set level such that the plurality of resistance coils are prevented from melting.

15. A pyrolysis machine comprising:
a hopper configured to accept feedstock;
a reactor tube connected to the hopper configured to conduct pyrolysis on the feedstock;
a conversion portion connected to the reactor tube wherein the conversion portion includes a tower and a fractional distillation column, the conversion portion configured to convert gases from the reactor tube into fluids for removal; and
a frame configured to support the hopper, the reactor tube, and the conversion portion;
wherein the hopper, the reactor tube, and the conversion portion and the frame are transportable, and wherein the tower and the fractional distillation column are configured to rotate about the frame and the reactor tube to accommodate transportation and installation at a job site.

16. The pyrolysis machine of claim 15, wherein the reactor tube includes a spring-shaped coil that is open at its center that is configured to move the feedstock.

17. The pyrolysis machine of claim 15, wherein the reactor tube includes a plurality of zones disposed along a length of the reactor tube, and wherein the pyrolysis machine further comprises a controller configured to independently regulate the temperature of each zone in the reactor tube.

18. The pyrolysis machine of claim 15, further comprising a plurality of ceramic band heaters located on the reactor tube configured to heat the reactor tube, the ceramic band heaters each including at least one resistance coil, and wherein the controller is configured to turn off each individual ceramic band heater of the plurality of ceramic band heaters when the temperature of the individual ceramic band heater reaches a set level such that the plurality of resistance coils are prevented from melting.

19. The pyrolysis machine of claim 15, further comprising a nitrogen distribution system configured to distribute nitrogen to the reactor tube, a catalyst tower, and a distillation column, wherein the amount of nitrogen provided by the nitrogen distribution system is controlled by the controller.

* * * * *